United States Patent
Beyda et al.

(10) Patent No.: US 6,260,160 B1
(45) Date of Patent: Jul. 10, 2001

(54) REMOTE TROUBLESHOOTING OF A COMPUTING DEVICE

(75) Inventors: William Joseph Beyda, Cupertino; Shmuel Shaffer, Palo Alto, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/097,881

(22) Filed: Jun. 15, 1998

(51) Int. Cl.[7] .................................................. G06F 11/00
(52) U.S. Cl. .................. 714/27; 713/2; 714/37; 714/46
(58) Field of Search ................. 714/27, 26, 37, 714/46; 713/2; 701/29

(56) References Cited

U.S. PATENT DOCUMENTS

| | | | |
|---|---|---|---|
| 5,442,305 | * 8/1995 | Martin et al. | 326/30 |
| 5,544,308 | * 8/1996 | Giordano et al. | 714/26 |
| 5,961,561 | * 10/1999 | Wakefield, II | 701/29 |
| 6,006,344 | * 12/1999 | Bell, Jr. | 714/37 |
| 6,029,258 | * 2/2000 | Ahmad | 714/46 |

* cited by examiner

Primary Examiner—Thomas Lee
Assistant Examiner—Nguyêñ Nguyên (57) ABSTRACT

A method and system for remotely troubleshooting a local computer connected to an array of local peripheral devices include a data collector connected to the local computer. The data collector includes a signal interceptor for intercepting signaling information transmitted by the computer to the peripheral devices. The intercepted signaling information has been formatted for processing by the local peripheral devices at a point of interception. The data collector further includes a transceiver having a transceiver input configured to relay signaling information received from remote peripheral devices located at a remote troubleshooting site to input/output (I/O) ports of local peripheral devices. A transceiver output is configured to transmit intercepted signaling information to the remote peripheral devices at the remote troubleshooting site. Each local peripheral device corresponds to a remote peripheral device having substantially identical functional and signaling capabilities as the local peripheral device. Upon receipt at a remote peripheral device, intercepted signaling information has a format which is substantially identical to the format of the intercepted signaling information at the point of interception. A technician located at the remote troubleshooting site is able to remotely operate the computer via the data collector and is able to monitor performance of the remote peripheral devices to diagnose a malfunction associated with the local computer and the local peripheral devices.

20 Claims, 5 Drawing Sheets

REMOTE TROUBLESHOOTING OF A COMPUTING DEVICE

BACKGROUND OF THE INVENTION

The invention relates to systems and methods for remote troubleshooting of computer system malfunctions and, more specifically, the invention relates to remote diagnosis of compatibility conflicts associated with peripheral devices connected to a computer system.

BACKGROUND OF THE RELATED ARTS

Providing technical product support for a computer often involves dispatching a technical support engineer to a site to perform a set of diagnostic routines to attempt to isolate a source of a malfunction. Having the customer support engineer on-site to diagnose the malfunction provides the benefit of allowing the engineer to have direct access to the computer system, including the computer and any associated peripheral devices. The expertise of the engineer is fully realized because the engineer does not have to rely on a customer to perform diagnostic routines and relay the results of the routines. However, the expense of having a support engineer travel to the customer's premises to perform the diagnostic evaluation is considerable. Furthermore, the engineer is likely removed from valuable diagnostic resources, including on-line information, repair manuals, and other technical support staff.

Alternatively, remote diagnosis can be performed remotely over the telephone by having the support engineer ask the customer questions about the malfunction and having the customer perform certain diagnostic functions on the computer and relay the results back to the engineer. This form of remote diagnosis relies heavily on the competence and interest of the customer. Often, the preliminary information required to begin the diagnosis is difficult to ascertain if the customer is unfamiliar with the operation of the computer system.

A partial solution to the above-described problems is disclosed in U.S. Pat. No. 5,455,933 to Schieve et al., which describes a method for remote diagnosis of personal computers. The method includes establishing a connection to a remote device over a modem, transmitting a menu of options comprising diagnostic routines, receiving a selection of a set of diagnostic routines to be executed by a local computer, and transmitting the results back to the remote site. An independent diagnostic operating system, which is independent of the primary operating system of the computer, is employed by the local computer to establish the remote connection, to execute the diagnostic routines, and to generate the signals used in communicating with the remote site. The method is particularly suited for remote diagnoses of malfunctions associated with booting failures, because the independent diagnostic operating system is capable of functioning in the absence of a properly functioning primary operating system. However, the method is not effective for diagnosing malfunctions associated with the operation of the computer while the primary operating system is functioning.

Other methods and systems allow remote access to a local computer during the operation of the primary operating system via, for instance, a modem to troubleshoot the local computer. A remote computer is able to operate the local computer by interacting with an operating system and/or application(s) on the local computer. The operating system of the local computer transmits signals over the modem in response to the commands. The transmitted signals contain data formatted for display on a remote monitor connected to the remote computer. The remote computer is equipped with monitor driver software which enables display of the transmitted data on the remote monitor. Moreover, the transmitted data is in a format utilized by access software employed by the remote device.

The remote access system is effective for detecting, for example, bugs in an application run on the local computer. Because the remote device utilizes its own drivers to enable display of data on the remote monitor, the remote access system is unable, among other things, to detect malfunctions associated with the local peripheral devices associated with the local computer. A need remains for a remote troubleshooting system which enables remote diagnoses of computer malfunctions associated with peripheral devices connected to a local computer.

SUMMARY OF THE INVENTION

A system and method for remotely troubleshooting a computer system including a local computer connected to an array of local peripheral devices at a local site include capturing signaling information directed to the local peripheral devices from the local computer and transmitting the captured signaling information to a remote troubleshooting site having a corresponding array of remote peripheral devices. The captured signaling information is formatted for processing by the local peripheral devices at the point of capture in accordance with specifications provided by driver software run on the local computer. Each local peripheral device corresponds to a remote peripheral device having substantially identical functional and signaling capabilities. The remote troubleshooting site is configured to cause the local computer to generate commands which are intercepted and transmitted to the remote peripheral devices and is further configured to monitor the array of remote peripheral devices in order to diagnose a malfunction in the local computer system.

The local computer system includes a transceiver adapted for transmitting and receiving peripheral device signaling information. In a preferred embodiment, the transceiver relays signaling information received from the remote site, which includes a request to the computer to transmit a command to one of the peripheral devices to execute a specified task. The request is relayed to the computer by the transceiver in a signaling format which is substantially identical to the format utilized by a local data entry device, such as a mouse or a keyboard, to transmit such a request. From the perspective of the computer, the request appears to have been locally generated. For instance, the request might include a print job request from a particular application. The request may be relayed by the transceiver to the local computer via a conventional keyboard input/output I/O port of the computer.

A signal intercepting device is configured to capture signaling information directed from the computer to one of an array of peripheral devices. In a preferred embodiment, the intercepting device is adapted to selectively intercept signaling information directed to particular local peripheral devices of the array. Alternatively the intercepting device is configured for bi-modal operation, wherein either signaling information for the entire array is intercepted or none of the signaling information is intercepted. The signaling information has already been formatted for processing by the local peripheral device to which it is directed at the point of interception, whereupon it can be transmitted via an output of the transceiver.

The transceiver output is configured to transmit the intercepted signaling information to the remote site. In one embodiment, the transceiver includes a modem functionality to enable receipt and transmission of the captured signaling information over a telephone network. Alternatively, the transceiver is configured to transmit and receive signaling information to the remote site over a data network, such as a local area network (LAN).

A modem is located at the remote site, if the signaling information is transmitted over a telephone network. The modem converts the signaling information to its original format upon capture. The captured signaling information is then transmitted to the appropriate remote peripheral device, and the peripheral device is monitored to determine the cause of the malfunction.

An example of a simple operation of the system might include utilizing a remote keyboard at the remote site to enter a request for a print job in a spreadsheet application running on the local computer. The transceiver input receives the request and relays it to the local computer. The computer transmits a print command to a local printer connected to the computer. The signal intercepting device intercepts the print command at a point where the print command signaling information has already been formatted for processing by the local printer. The signaling information is then transmitted to the transceiver output, which transmits it to the remote site where it is directed to a remote printer having substantially identical signaling and functional capabilities to the local printer. Upon being received at the remote printer, the print command signaling information has a substantially identical format to the information when it was intercepted.

The remote printer might make a failed attempt to execute the print command and transmit an unable-to-print message to the computer indicative of a conflict between the application and printer driver software. In response to the message, the computer transmits data representative of the conflict message to be displayed on a local visual monitor. The signal interception device intercepts the conflict message data, and the transceiver transmits the conflict message to a remote visual monitor at the remote site, where it is displayed.

In a preferred embodiment, the system is utilized in conjunction with remote software installation to determine whether any incompatibilities between the installed software and device drivers associated with the peripheral devices create potential for malfunctions during operation of the local computer system.

The substantial identicalness of the local peripheral devices to the remote peripheral devices and the local signaling information format to the remote signaling information format enable a technician located at the remote troubleshooting site to remotely troubleshoot the computer as though the technician were located at the local site. The technician is able to monitor the operation of the remote peripheral devices and to gather diagnostic data, including data presented at the remote computer monitor. Furthermore, the data presented at the computer monitor provides diagnostic information regarding device drivers and compatibility conflicts between peripheral devices and the computer.

DETAILED DESCRIPTION

Figure 1:
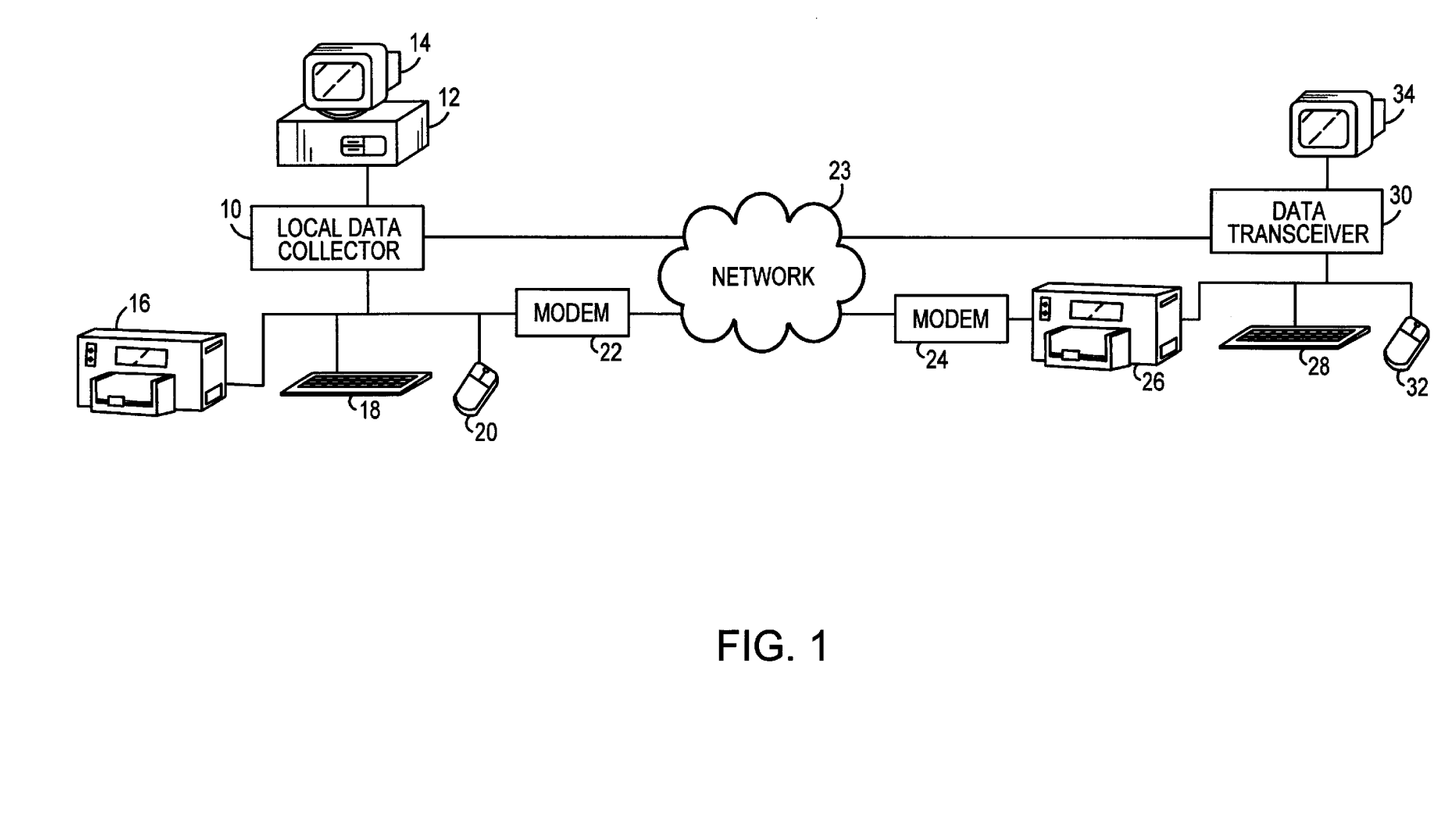
FIG. 1 is a schematic diagram of a local computer system connected to a remote troubleshooting site via a communications network.

With reference to FIG. 1, a system for remote troubleshooting of a local computer system includes a local data collector 10 associated with the local computer system, which includes a local computer 12 associated with multiple local peripheral devices. The data collector 10 is adapted for intercepting signaling information directed to the local peripheral devices from the computer 12 and transmitting the intercepted signaling information to the remote troubleshooting site via a communications network 23. The data collector 10 also relays signaling information to the computer 12 received via the communications network 23 from remote peripheral devices at the remote troubleshooting site. The local peripheral devices include a local computer monitor 14, a local printer 16, a local keyboard 18, a local mouse 20, and a local modem 22. In a preferred embodiment, the local modem 22 and the local data collector 10 can each independently establish a communication link to the remote troubleshooting site.

The remote troubleshooting site includes a remote data transceiver 30 capable of receiving signaling information intercepted by the data collector 10 and relaying the information to remote peripheral devices at the remote site. The remote peripheral devices include a remote modem 24, a remote printer 26, a remote keyboard 28, a remote mouse 32, and a remote monitor 34. The local data collector 10 and the remote data transceiver 30 cooperate to exchange signaling information in a manner that enables a user of the remote troubleshooting site to essentially take over operational control of the computer 12. The remote troubleshooting site can be located on the same network, for example a LAN, as the local computer system, or the remote site can be connected to the computer system via a telecommunications link such as a T1 carrier, an ISDN line, or an analog telephone line via a public switch telephone network.

Transfer of operational control over the local computer 12 to the remote troubleshooting site is facilitated by the capability of the data collector 10 and the remote data transceiver 30 to establish a communication link over which the data collector 10 transmits intercepted signaling information which the computer 12 has transmitted to the local peripheral devices. The intercepted signaling information has already been formatted for processing by the local peripheral devices when the signaling information is intercepted by the data collector 10. The data collector 10 transmits the intercepted signaling information to the remote data transceiver 30, which relays the signaling information to the appropriate remote peripheral devices. The signaling information has a substantially identical format when it is received at a remote local peripheral device as when it is intercepted by the data collector 10. Furthermore, each remote peripheral device has a substantially identical configuration to its corresponding local peripheral device. For instance, the remote printer 26 is the same printer (preferably the same make and model) as the local printer 16. Consequently, the remote troubleshooting site essentially recreates the same peripheral device environment that is associated with the local computer 12.

Figure 2:
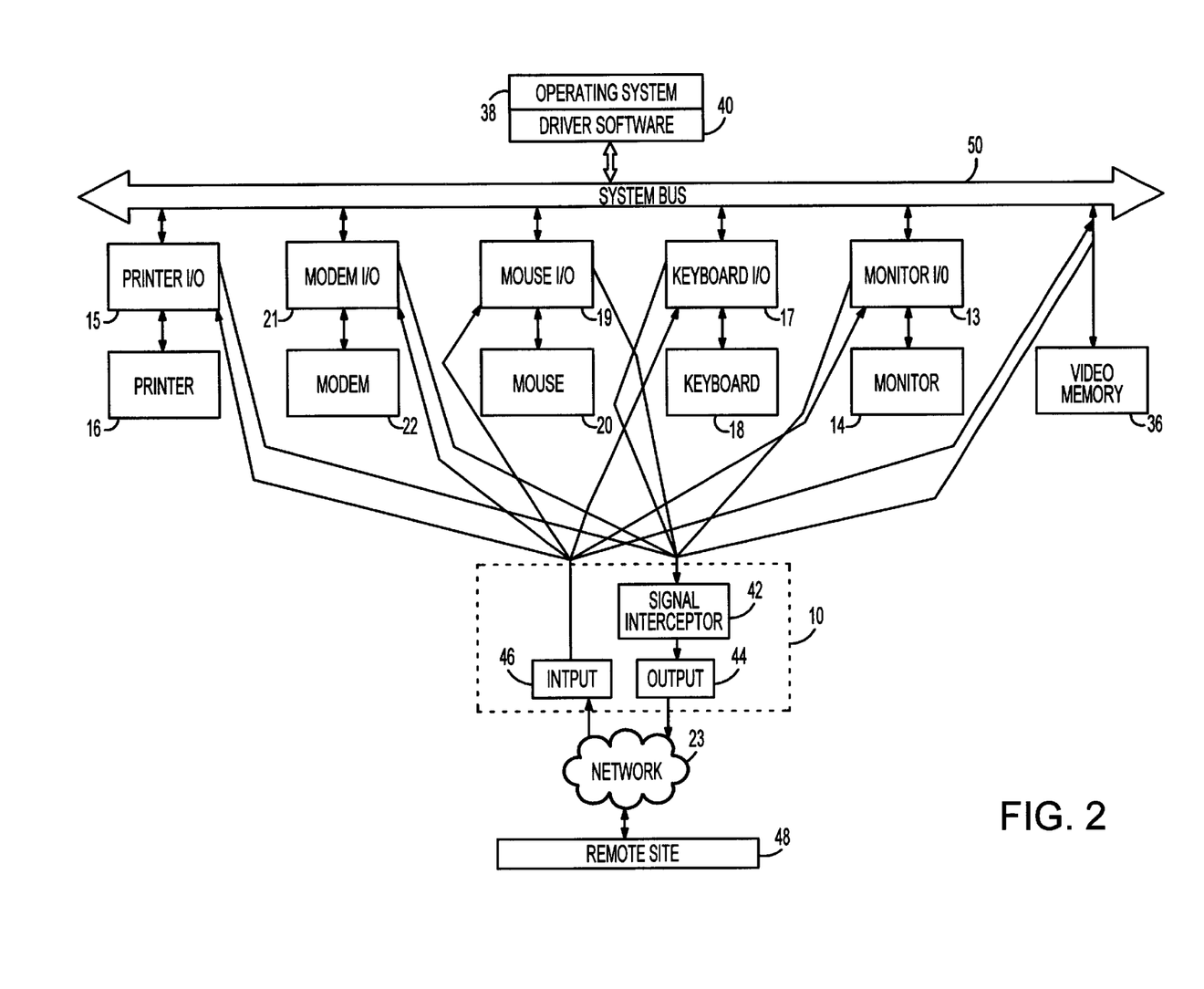
FIG. 2 is a block diagram illustrating the functional interrelationship of a local data collector and components of the local computer system shown in FIG. 1.

With reference to FIG. 2, the data collector 10 includes a signal interceptor 42 connected to input/output (I/O) ports of the local peripheral devices including a printer I/O port 15, a modem I/O port 21, a mouse I/O port 19, a keyboard I/O port 17, and a monitor I/O port 13. The signal interceptor 42 is adapted for intercepting signaling information directed from the computer 12 when the data collector 10 is activated. When the data collector 10 is not activated, it allows signaling information from the computer 12 to pass through to the local peripheral devices to allow the local computer system to function in its standard operating mode. The data collector 10 reports to an operating system 38 of the computer 12 upon each boot up of the computer 12, so that data collector driver software 40 is loaded into random access memory (RAM), not shown, upon each boot up of the computer 12. The data collector driver software only causes peripheral device signaling information to be routed through the signal interceptor 42 when the data collector driver software 40 is activated.

In an alternative embodiment, the data collector 10 only reports to the operating system 38 when the data collector 10 is given specific instructions to report to the operating system upon rebooting. The data collector driver software is installed and remains active until it is deactivated by, for example, rebooting without having the data collector 10 respond to polling during the booting process. In this alternative embodiment, the data collector preferably is connected to a reset switch (not shown) of the computer 12. Prior to initiating a remote troubleshooting session, the data collector 10 is given specific instructions to report to the operating system 38 upon the next boot up of the computer 12, and the connection to the reset switch is utilized to initiate rebooting of the computer 12.

The signal interceptor 42 can be configured to only intercept signaling information associated with particular local peripheral devices of interest and to disregard signaling information associated with other local peripheral devices. Alternatively, the signal interceptor 42 can operate in a default mode wherein signaling information associated with all local peripheral devices is captured for transmission to the remote troubleshooting site 48. The signal interceptor 42 intercepts peripheral device signaling information from the I/O ports of a peripheral device after it has been processed by the appropriate driver software 40 and is formatted for processing by the appropriate peripheral device. The signal interceptor 42 transmits the signaling information to the data collector output 44 to be transmitted to the remote site 48.

The data collector output 44 organizes, formats and transmits the intercepted signaling information to the remote site 48 via the communications network 23. If the remote site 48 shares a digital connection with the local computer system, the data collector output will include an analog-to-digital (A/D) functionality to convert any analog signaling information to a digital format for transmission via the digital connection. The output 44 also uses time division multiplexing, which is known in the art, to create a data stream, including signaling information from the various peripheral devices to ensure that the data transceiver 30 at the remote site is able to direct the signaling information to the appropriate remote peripheral device. For instance, intercepted signaling information directed to the local monitor 14 is processed by the output 44 to indicate to the remote data transceiver 30 that the signaling information is to be relayed to the remote monitor 34.

The data collector 10 further includes an input 46 which relays signaling information received via the communications network 23 from a remote peripheral device to the I/O port of the appropriate local peripheral device. The input 46 uses time division multiplexing to separate out signaling information from a data stream received from the remote site in order to relay signaling information to the appropriate I/O ports. For instance, signaling information received from the remote keyboard 28 is relayed by the data collector input 46 to the keyboard I/O port 17. If necessary, the input 46 converts the received signaling information to the format that is utilized by the local peripheral devices. If the local keyboard 18 is configured to transmit signaling information having an analog format to the keyboard I/O port 17, the input 46 will convert signaling information received in a digital format to the analog format utilized by the keyboard 18. If, on the other hand, signaling information is received from the remote video memory 54 over an analog modem connection, the signaling information will be converted to a digital format prior to being relayed by the input 46 to the system bus 50.

Figure 3:
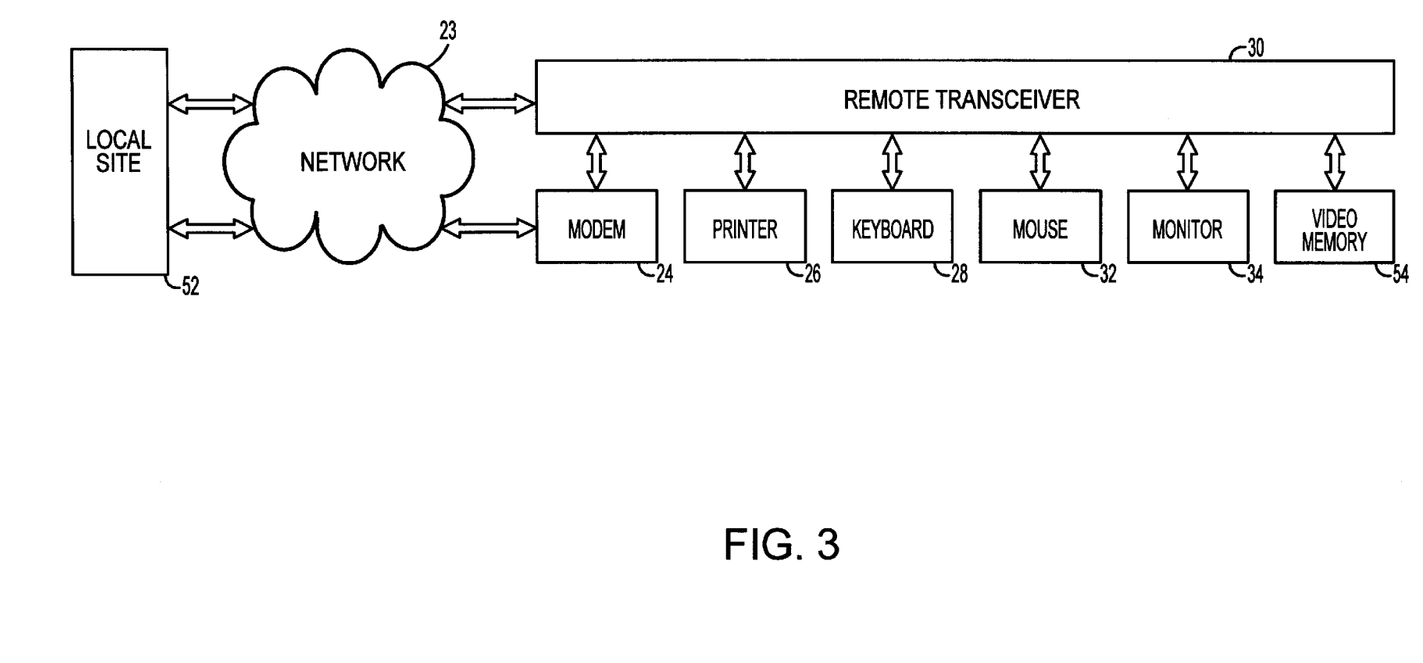
FIG. 3 is a block diagram illustrating the functional interrelationship of components mote troubleshooting site illustrated in FIG. 1.

With reference to FIG. 3, the remote transceiver 30 is connected to the various remote peripheral devices so that intercepted signaling information received from the local data collector output 44 can be relayed to the appropriate remote peripheral device. The remote transceiver 30 also relays signaling information generated by the remote peripheral devices to the data collector input 46 at the local site 52 via the communications network 15. The remote transceiver 30 utilizes time division multiplexing to separate out intercepted signaling information from a data stream received from the data collector output 44. If necessary, the remote transceiver 30 converts the format of received signaling information to the format utilized by a particular peripheral device. For instance, if the remote transceiver receives 30 signaling information from the data collector output 44 over an analog modem connection, the remote transceiver will convert the received signaling information to a digital format for storage in remote video memory 54. The remote transceiver 30 will also convert the format of signaling information generated by the remote peripheral devices to an appropriate format for transmission over a communication link to the local data collector input 46 when necessary.

With reference to FIGS. 1 through 4, a preferred method for performing remote troubleshooting according to the present invention includes the step 60 of transmitting a request for remote troubleshooting. In the embodiment wherein the remote troubleshooting site is connected to the computer system via a telecommunication network connection, the troubleshooting request might be transmitted via the local modem 22 to the remote modem 24. The request can be in the form of an e-mail message or an Internet Protocol (IP) telephone call, although the format of the request is not critical to the invention. The request can include a preliminary description of the computer system malfunction which requires troubleshooting. For example, the user of the computer 12 might describe a problem wherein the system is unable to print a document in a particular video application (not shown). Assume that printing from the application requires interaction with a video driver associated with the video memory 36.

Figure 4:
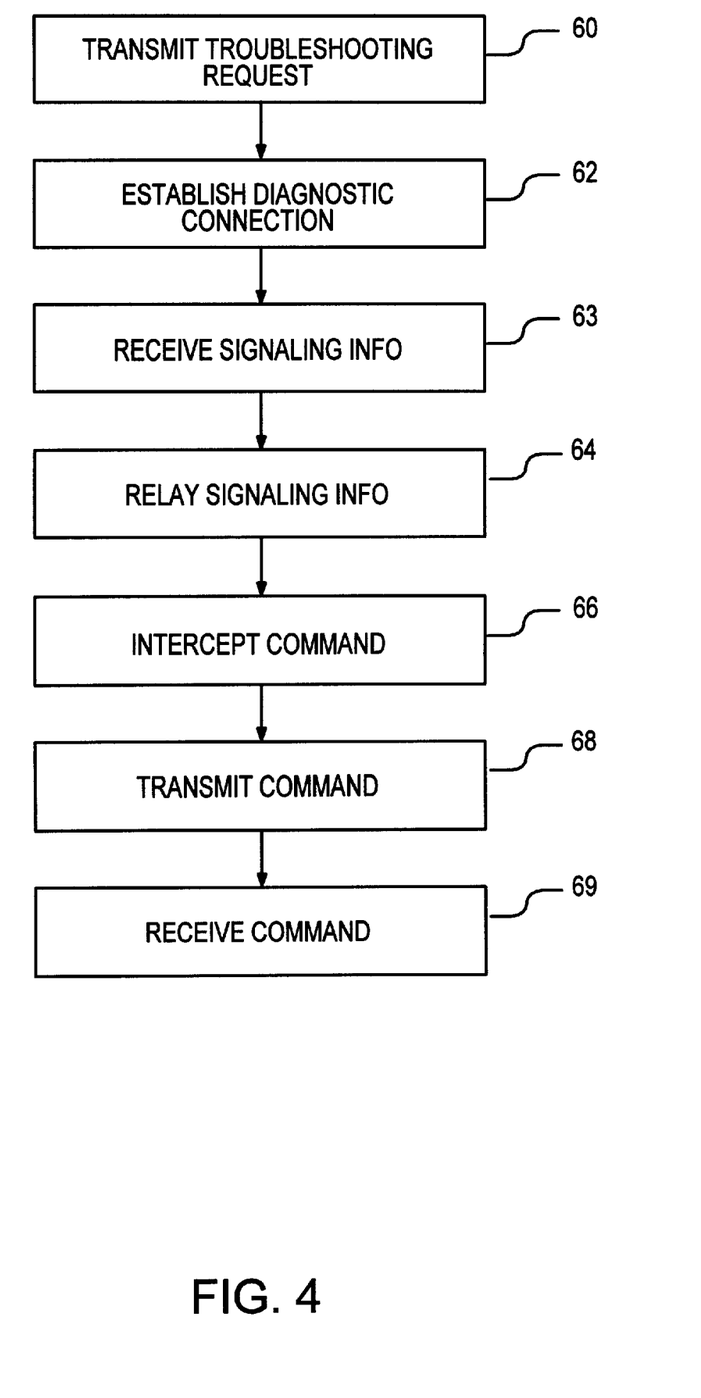
FIG. 4 is a process flow of a method for remotely troubleshooting a local computer utilizing the local data collector shown in FIG. 2.

In step 62, a communication link is established over which troubleshooting procedures will be performed. As previously noted, the connection can be a network link over a LAN, if the remote troubleshooting site 48 is located on the same LAN as the computer system, or the connection can be over a telecommunications link connecting two independent networks. In order to establish the diagnostic connection, the data collector driver software must be activated either by rebooting the computer 12 and instructing the data collector 10 to report to the operating system 38 during the boot up process, or by instructing the operating system to activate the data collector driver software if the driver software has already been written into RAM of the computer 12.

Once the diagnostic connection is established, a technician at the remote troubleshooting site is able to utilize a remote data entry device, such as the remote mouse 32 or the keyboard 28, to transmit requests which are received at the local site 52 in step 63. For instance, the technician might access the video application and transmit a print job request for the same file from which the user was unable to print. Alternatively, the technician can access memory (not shown) which includes the keystrokes which the user generated during an application session in which the malfunction manifested itself. The technician can then retransmit the same requests as the user transmitted during the previous application session.

In step 64, the data collector input 46 relays the requests received from the remote keyboard 28 to the local keyboard I/O port 17. To the computer 12, the relayed requests appear to have been generated by the local keyboard 18. The operating system 38 responds to the print request by writing data representative of the image to be printed to the video memory, transmitting a print command to the local printer 16, and transmitting a command to the monitor to display the image on the local monitor 14. Printer driver software instructs the printer 16 to print the image as the image appears when presented on the monitor from the video application. The print job consequently requires cooperation between the printer driver software and the video driver software.

In step 66, the signal interceptor 42 intercepts the print command, the display command, and the image data to be written into local video memory 36 and transmits the signaling information to the data collector output 44 which transmits the signaling information to the remote site 48 in step 68. The remote transceiver 30 receives and processes the signaling information in step 69 and relays the display command to the remote monitor 34, relays the image data to the remote video memory 54, and relays the print command to the remote printer 26. The technician can observe the remote monitor 34 and the remote printer 26 to determine the source of the malfunction, which might be an incompatibility of the printer driver and the video driver. If the initial print request was insufficient to reveal the incompatibility, the technician transmits additional requests to the local computer 12 to transmit additional commands to the local peripheral devices and monitor the performance of the remote peripheral devices. The technician can also query the operating system 38 to determine a source of the malfunction. In short, the technician can perform almost any diagnostic procedure from the remote troubleshooting site which can be performed from the local computer system.

Figure 5:
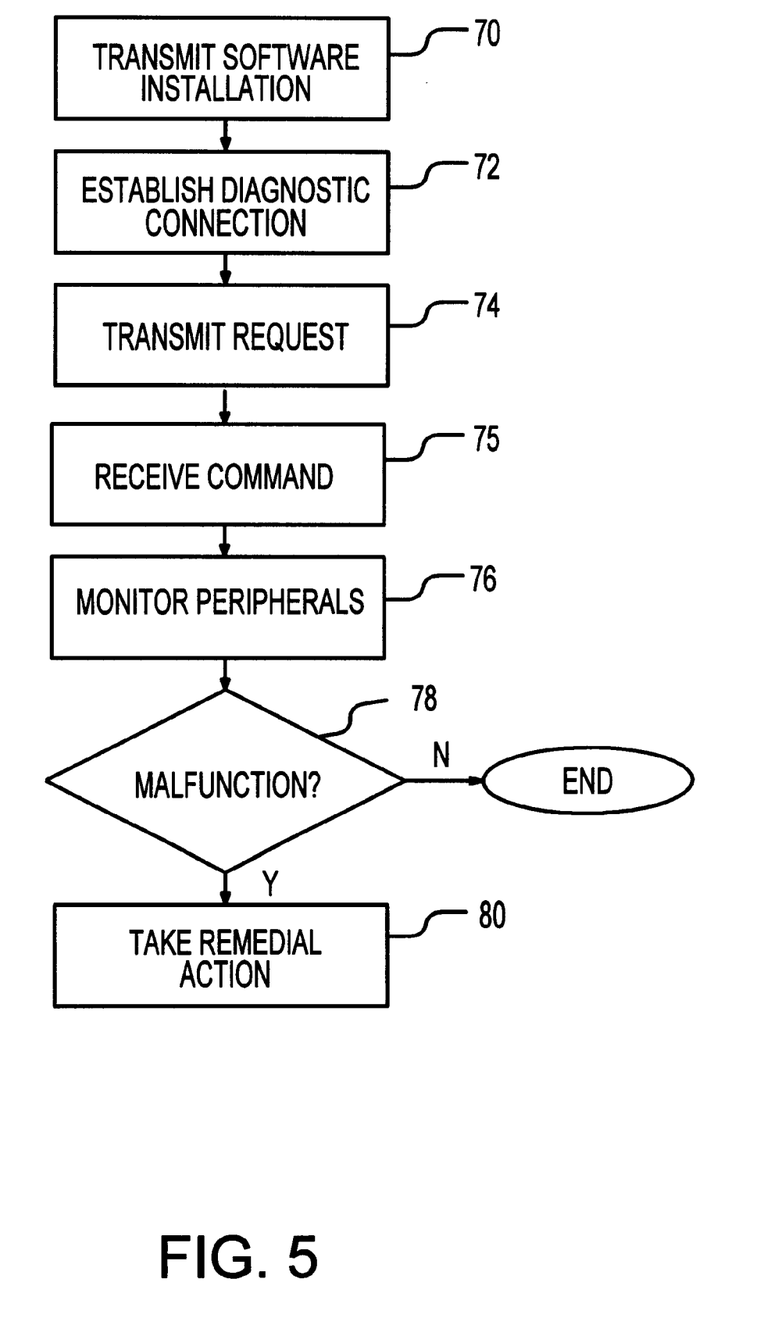
FIG. 5 is a process flow of a method for remotely troubleshooting the local computer system shown in FIG. 1 after a remote software installation.

With reference to FIG. 5, an alternative method for remote troubleshooting includes diagnostic procedures for detecting possible computer system malfunctions associated with a remote software installation. In step 70, a software installation procedure is executed from the remote troubleshooting site 48. For instance, a new printer driver might be installed upon discovering that the previous printer driver was incompatible with the video driver of the computer system. In step 72, a diagnostic connection is established between the data collector 10 and the remote transceiver 30. In step 74, requests are transmitted to the computer 12 to issue particular commands to the local peripheral devices to perform preselected routines. The requests are selected to test for any software or hardware incompatibilities which might be associated with the remote software installation.

The data collector input 46 relays the requests to the local keyboard I/O port 17, and in response the computer 12 issues the command(s) to the appropriate local peripheral device(s). The signal interceptor 42 captures the command signaling information and the data collector output 44 transmits the signaling information to the remote site, where the remote transceiver 30 receives and relays the command(s) to the remote peripheral device(s) in step 75. In step 76, the technician monitors the peripheral device to determine in step 78 whether a malfunction has been detected. If a malfunction is detected, in step 80 remedial action, such as deinstalling the software, is taken.

What is claimed is:

1. A method for performing remote troubleshooting of operational malfunctions associated with a computing device at a local site comprising the steps of:

at said local site, receiving signaling information from a remote site, said signaling information including a request for said computing device to issue a command for a local peripheral device to perform a specified function;

relaying said signaling information to said computing device;

issuing said command in response to said signaling information, said command being issued from said computing device and being formatted and directed for processing by said local peripheral device;

capturing said command issued from said computing device to said local peripheral device; and transmitting said captured command to said remote site for application to a remote peripheral device.

2. The method of claim 1 further comprising the step of receiving said command at said remote peripheral device, said remote peripheral device having substantially identical functional capabilities and signaling capabilities as said local peripheral device, said command being in a substantially identical format upon reception at said remote peripheral device as upon capture at said local site.

3. The method of claim 2 further comprising the step of monitoring a performance of said remote peripheral device in executing said specified function.

4. The method of claim 1 wherein said step of relaying said signaling information to said computing device includes relaying said signaling information in a format substantially identical to a signaling information format utilized by a local data entry device associated with said computing device.

5. The method of claim 1 further comprising the step of relaying a software installation to said computing device from said remote site, said specified function designated by said command requiring a cooperative interaction with a program included in said software installation.

6. The method of claim 5 further comprising the steps of:

receiving said command at said remote peripheral device; and monitoring an execution of said specified function by said remote peripheral device.

7. The method of claim 1 wherein said capturing step includes capturing signaling information directed to a local data presentation device, said transmitting step including transmitting said signaling information directed to said local data presentation device to a remote data presentation device having functional capabilities and signaling capabilities substantially identical to functional and signaling capabilities of said local data presentation device.

8. The method of claim 7 further comprising the steps of:

monitoring said remote data presentation device upon reception of said captured signaling information by said remote data presentation device; and diagnosing an operational malfunction associated with said computing device and said local peripheral device based on a presentation of said captured signaling information at said remote presentation device.

9. A system for remotely troubleshooting a malfunction associated with a computing device located at a local site comprising:

means for intercepting signaling information directed to at least one local peripheral device associated with said computing device, said signal intercepting means having an input/output connected to said computing device, said signaling information being formatted for processing by said at least one local peripheral device upon interception at said input/output, said signaling information originating from said computing device;

a transceiver configured to transmit said signaling information intercepted by said signal intercepting means to a remote site and to receive second signaling information from said remote site, said transceiver comprising:

a) an output enabled to transmit said intercepted signaling information to said remote site in a format configured to activate at least one remote peripheral device that is compatible with said at least one local peripheral device; and b) an input enabled to direct said second signaling information received from said at least one remote peripheral device to said computing device in a format substantially identical to a format of signaling information utilized by said at least one local peripheral device during communication with said computing device.

10. The system of claim 9 wherein said transceiver input is responsive to reception of an issue-command request to relay said request to said computing device, said issue-command request having been received from a remote data entry device and including a request to said computing device to issue a command to a designated local peripheral device to execute a specified function.

11. The system of claim 9 further comprising a remote troubleshooting site in communicative contact with said computing device via said transceiver, said remote troubleshooting site being located at said remote site and including said at least one remote peripheral device.

12. The system of claim 11 wherein said at least one local peripheral device includes a local data presentation device, said at least one remote peripheral device including a remote data presentation device and a remote data entry device.

13. The system of claim 12 wherein said remote data entry device is configured to transmit a request via said transceiver input to said computing device to issue a command to said local data presentation device to execute a specified function, said intercepting means being responsive to said execute command transmitted from said computing device to intercept said execute command, said transceiver output being enabled to transmit said execute command to said remote data presentation device in response to said interception of said execute command by said intercepting means.

14. The system of claim 12 wherein said remote data presentation device and said remote data entry device respectively have substantially identical functional capabilities and signaling capabilities as said local data presentation device and a local data entry device.

15. The system of claim 12 wherein said remote troubleshooting site includes a data transmitting device associated with memory including a software program, said data transmitting device being configured to remotely install said software program into said computing device, said remote data entry device being enabled to transmit an issue command request to said computing device via said transceiver input, said issue command request including instructions to said computing device to transmit a command to said local data presentation device to cooperatively perform a specified function with said remotely installed software program.

16. A method for remotely diagnosing a malfunction associated with a computer system comprising the steps of:

establishing a communication link supporting signaling exchange between a plurality of remote peripheral devices and a local computing device, said plurality of remote peripheral devices including a remote data entry device and a remote data presentation device, said remote data entry device and said remote data presentation device respectively having substantially identical functional and signaling capabilities to functional and signaling capabilities of a local data entry device and a local data presentation device associated with said local computing device;

relaying an issue command request from said remote data entry device to said local computing device, said issue command request including instructions to said local computing device to transmit a command to said local data presentation device to perform a specified function;

intercepting said command transmitted from said local computing device to said local data presentation device, said command having been formatted to be processed by said local data presentation device prior to being intercepted; and transmitting said intercepted command to said first remote data presentation device.

17. The method of claim 16 wherein said step of relaying said issue command request includes relaying said request in a format utilized by said local data entry device during communication with said local computing device.

18. The method of claim 16 further comprising a step of receiving a software installation from said remote site, said command including instructions to said local data presentation device to cooperatively perform said specified function with a program included in said software installation.

19. The method of claim 16 further comprising the steps of receiving said command at said first remote data presentation device and monitoring a performance of said specified function by said remote data presentation device to diagnose said computer system malfunction.

20. The method of claim 19 wherein said step of receiving said command at said remote data presentation device includes said command in a format substantially identical to a format of said command at a point of interception.

* * * * *